US012079068B2

(12) United States Patent
Schaefer

(10) Patent No.: US 12,079,068 B2
(45) Date of Patent: Sep. 3, 2024

(54) ERROR LOG INDICATION VIA ERROR CONTROL INFORMATION

(71) Applicant: Micron Technology, Inc., Boise, ID (US)

(72) Inventor: Scott E. Schaefer, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/889,982

(22) Filed: Aug. 17, 2022

(65) Prior Publication Data

US 2023/0072766 A1 Mar. 9, 2023

Related U.S. Application Data

(60) Provisional application No. 63/238,004, filed on Aug. 27, 2021.

(51) Int. Cl.
*G06F 11/00* (2006.01)
*G06F 11/07* (2006.01)

(52) U.S. Cl.
CPC ........ *G06F 11/0787* (2013.01); *G06F 11/073* (2013.01); *G06F 11/0769* (2013.01)

(58) Field of Classification Search
CPC ............... G06F 11/0787; G06F 11/073; G06F 11/0769; G06F 11/1048
See application file for complete search history.

(56) References Cited

U.S. PATENT DOCUMENTS

| 4,375,664 | A | * | 3/1983 | Kim | ...................... | G06F 11/073 |
| | | | | | | 714/764 |
| 4,964,129 | A | * | 10/1990 | Bowden, III | ......... | G06F 11/073 |
| | | | | | | 714/719 |
| 2020/0301779 | A1 | * | 9/2020 | Chung | ................... | G11C 29/52 |
| 2022/0334905 | A1 | * | 10/2022 | Kim | ...................... | G06F 11/079 |
| 2023/0061144 | A1 | * | 3/2023 | Schaefer | ............. | G06F 11/0772 |

* cited by examiner

*Primary Examiner* — Amine Riad
(74) *Attorney, Agent, or Firm* — Holland & Hart LLP

(57) ABSTRACT

Methods, systems, and devices for error log indication via error control information are described. For instance, a memory device may transmit, to a host device, a first signal including a set of error control bits indicating that an error log of the memory device includes information for use by the host device. The memory device may receive, from the host device in response to the first signal, a second signal including a request to retrieve the information of the error log. The memory device may transmit, to the host device in response to the second signal, a third signal including the information of the error log.

28 Claims, 7 Drawing Sheets

ERROR LOG INDICATION VIA ERROR CONTROL INFORMATION

CROSS REFERENCE

The present application for patent claims the benefit of U.S. Patent Application No. 63/238,004 by Schaefer, entitled "ERROR LOG INDICATION VIA ERROR CONTROL INFORMATION," filed Aug. 27, 2021, which is assigned to the assignee hereof, and is which is expressly incorporated by reference in its entirety herein.

FIELD OF TECHNOLOGY

The following relates generally to one or more systems for memory and more specifically to error log indication via error control information.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
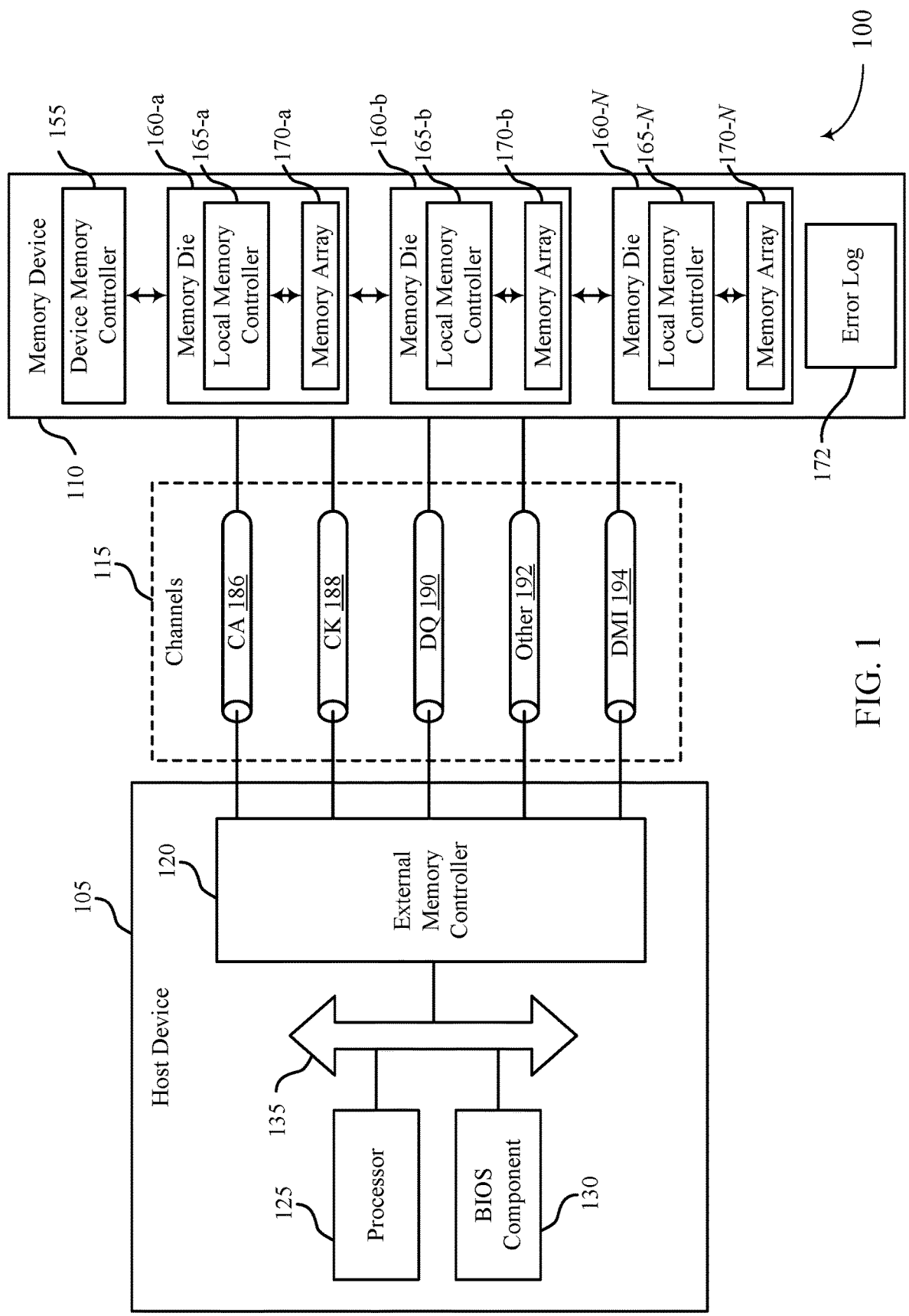
FIG. 1 illustrates an example of a system that supports error log indication via error control information in accordance with examples as disclosed herein.

A memory system (e.g., a memory system that includes one or more memory devices, such as dynamic random access memory (DRAM) devices) may use an error log to record and communicate errors that occur in the memory system. Some memory systems may implement a communication protocol (e.g., a special function select protocol, such as a DSF+ protocol) that includes a dedicated interval or set of bits for indicating that the error log includes information for a host device. However, other memory systems may not implement a communication protocol that includes the dedicated interval or set of bits.

The present disclosure describes techniques for conveying an indication that the error log includes data for a host device (e.g., in examples in which the memory system does not implement a communication protocol that includes the dedicated interval or set of bits). For instance, memory systems that do not implement a communication protocol including the dedicated interval or set of bits may implement a communication protocol including an interval for conveying error control codes associated with link error control procedures used to detect and/or correct errors in data communicated between the host device and the memory system. However, one or more of the possible error control codes that the memory system may convey may be less likely to be useable for error correction and/or detection. For example, many error control operations are configured to detect a first quantity of errors and/or correct a second quantity of errors. Some error control codes associated an error control operation may indicate a multi-bit error that is outside of the first quantity and/or second quantity. In such examples, that error control code may be used to indicate that the error log includes information without loss of useful information for the error control operation.

In some examples, one or more error correction codes less likely to be useable for error correction and/or detection may instead be used to convey the indication that the error log includes data for the host device and/or to indicate a state of the error log to the host device. For instance, if a fault is recorded in the error log, the memory device may adjust (e.g., transform) the error control code that is determined by the error control operation to be the error control code configured to indicate to the host device to read the error log. The host device may receive the error control code and may read the error log (e.g., by issuing a mode register read (MRR) command).

Features of the disclosure are initially described in the context of systems as described with reference to FIG. 1. Features of the disclosure are described in the context of a process flow and a timing diagram as described with reference to FIGS. 2-3. These and other features of the disclosure are further illustrated by and described with reference to apparatus diagrams and flowcharts that relate to error log indication via error control information as described with reference to FIGS. 4-7.

FIG. 1 illustrates an example of a system 100 that supports error log indication via error control information in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, one or more data mask invert (DMI) channels 194, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

In some examples, the one or more other channels 192 may include one or more error control channels. The error control channels may be operable to communicate error detection signals, such as checksums, to improve system reliability. An error control channel may include any quantity of signal paths. In some cases, a DMI channel may be an example of an error control channel.

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of a M-ary modulation scheme where M is equal to two. Each symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some examples, a multi-symbol (or multi-level) modulation scheme may be used to modulate signals communicated between the host device 105 and the memory device 110. A multi-symbol modulation scheme may be an example of a M-ary modulation scheme where M is greater than or equal to three. Each symbol of a multi-symbol modulation scheme may be operable to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and/or others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

An example table indicating values stored by MR125 when a corresponding memory device is provided with an MRR is provided below. MR125 may be configurable to store information related to the error log feature or store information related to the S-Check$^{MRR}$ features based on the configuration of the memory system.

TABLE 1

| | | | | | MR125 | | | | |
|---|---|---|---|---|---|---|---|---|---|
| MR | Feature | OP[7] | OP[6] | OP[5] | OP[4] | OP[3] | OP[2] | OP[1] | OP[0] |
| 125 | Error Log | Fuse Load | TM | mBIST | Temp Sensor | MR43 OP[7] | Health Monitor | CA Parity | Error Log |
| 125 | S-Check$^{MRR}$ | Fuse Load | TM | mBIST | Temp Sensor | MR43 OP[7] | Health Monitor | CA Parity | Synd. Check |

In some examples, the memory device 110 may include an error log 172. The error log 172 may record and communicate errors that occur in the memory device 110. For instance, the error log (e.g., via mode register (MR)) may indicate that a command/address (CA) write parity error has occurred (e.g., by indicating a bit value of 1 or flipping a first bit of a set of bits, operand (OP)[1] of MR125); that a health monitor of the memory device 110 has detected a condition for the memory device 110 (e.g., by indicating a bit value of 2 or flipping a second bit of the set of bits, OP[2] of MR125); that a link error correcting code (ECC) error (e.g., of MR43) has occurred (e.g., by indicating a bit value of 3 or flipping a third bit of a set of bits, OP[3] of MR125); that an internal temperature of the memory device is too high (e.g., by indicating a bit value of 4 or flipping a fourth bit of the set of bits, OP[4] of MR125); that a memory built-in self-test (mBIST) has failed (e.g., by indicating a bit value of 5 or flipping a fifth bit of the set of bits, OP[5] of MR125); that the memory device has unintendedly (e.g., without receiving an explicit indication) entered test mode (TM) (e.g., by indicating a bit value of 6 or flipping a sixth bit of the set of bits, OP[6] of MR125); or that a fuse check load error has occurred (e.g., by indicating a bit value of 7 or by flipping a seventh bit of the set of bits, OP[7] of MR125). In some examples, error log 172 may be or may include a master error log.

In some examples, the error log may indicate a syndrome check status associated with the error control operation (e.g., S-Check$^{MRR}$). For instance, a bit value of 0 (e.g., of MR125, OP[0]) may indicate a syndrome check status (e.g., instead of an error log status). For instance, in a first example, the memory device may implement a DSF+ communication protocol, the error log and a voltage regulator off (VROF) status may be disabled, and a syndrome check may be enabled. In some such examples, OP[0] of MR125 may indicate a syndrome check status (e.g., instead of an error log status). In some such examples, the memory device may not perform a logical OR operation on MR125 OP[0] with MR125 OP[7:1] and may instead hold a state of the syndrome check. Accordingly, when a high syndrome check value (e.g., a syndrome check value above a threshold) is generated, the syndrome check value may be applied to MR125 OP[0]. This value may be held at MR125 OP[0] until it is reset by a reset command or until an MRR command is received for MR125. If the DSF+ communication protocol is disabled at the memory device and the error log is enabled, OP[0] may not contain the syndrome check status (e.g., instead OP[0] may contain the error log status).

OP[7] through OP[1] may correspond to the examples as described herein, for example, with reference to FIG. 1. OP[7] through OP[0] corresponding to the error log feature may be read out when the error log feature is enabled via OP[6] of MR126. OP[7] through OP[0] corresponding to the S-Check$^{MRR}$ may be read out when the error log and DSF+ are disabled via MR126 OP[5,2] while syndrome check may be enabled via MR126 OP[1] and MR124 OP[7:0]. The present example is non-limiting and that different registers and OPs may be used to represent the features described herein without deviating from the scope of the present disclosure In some examples, the one or more DMI channels 194 may be configured to communicate information between host device 105 and memory device 110. For instance, the one or more DMI channels 194 may communicate flags associated with the error log 172.

In some examples, a memory device 110 that includes an error log 172 may implement a communication protocol (e.g., a special function select protocol, such as a DSF+ protocol) that includes a dedicated interval for indicating that the error log 172 includes information for a host device 105. However, in other examples, the memory device 110 may not implement a communication protocol that includes the dedicated interval.

The present disclosure describes techniques for conveying an indication that the error log 172 includes data for a host device 105 (e.g., in examples in which the memory device 110 does not implement a communication protocol that includes the dedicated interval). For instance, if memory device 110 does not implement a protocol that includes the dedicated interval, the memory device 110 may implement a protocol that includes an interval for conveying error control codes associated with link error control procedures used to detect and/or correct errors in data communicated between the host device 105 and the memory device 110. However, one or more of the possible error control codes that the memory device 110 may convey may not be usable by the host device 105 for error correction and/or detection. One or more of those error control codes may be used to indicate that the error log includes information to be used by the host device 105.

In some examples, one or more error correction codes unusable for error correction and/or detection may instead be used to convey the indication that the error log 172 includes data for the host device 105 and/or to indicate a state of the error log 172 to the host device 105. For instance, if a fault is recorded in the error log 172, the memory device 110 may adjust (e.g., transform) the error control code that is configured to indicate to the host device 105 to read the error log 172. The host device 105 may receive the error control code and may read the error log 172 (e.g., by issuing an MRR command).

Figure 2:
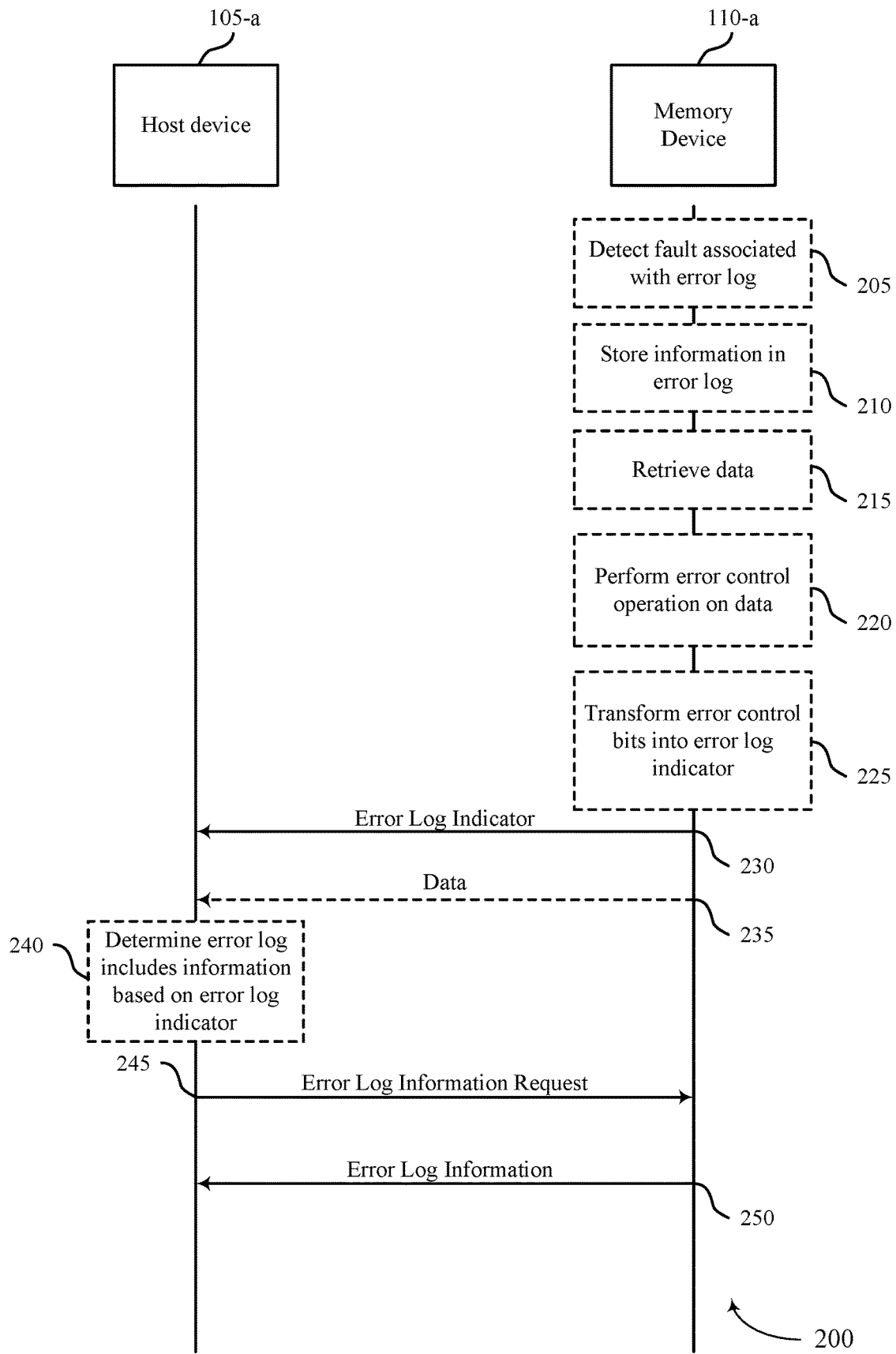
FIG. 2 illustrates an example of a process flow that supports error log indication via error control information in accordance with examples as disclosed herein.

FIG. 2 illustrates an example of a process flow 200 that supports error log indication via error control information in accordance with examples as disclosed herein. In some examples, process flow 200 may be implemented by one or more aspects of system 100. For instance, host device 105-a may be an example of a host device 105 as described with reference to FIG. 1 and memory device 110-a may be an example of a memory device 110 as described with reference to FIG. 1.

At 205, memory device 110-a may detect a fault associated with an error log (e.g., an error log 172) of memory device 110-a. In some examples, the error log may be or may include a master error log.

At 210, memory device 110-a may store information associated with the fault in the error log. In some examples, the information associated with the error log may be stored in a mode register.

At 215, memory device 110-a may retrieve data from a storage device (e.g., a memory array, such as a memory array 170 as described with reference to FIG. 1) of the memory device 110-a. For example, the host device 105-a may transmit a read command to the memory device 110-a. In response to receiving the read command, the memory device 110-a may retrieve the data.

At 220, memory device 110-a may perform an error control operation on the data that is being transmitted to the host device 105-a. Such an error control operation may be an example of a link error control operation or link error correcting code (ECC) for the memory system. As part of the error control operation, the memory device 110-a may determine a first set of error control bits associated with the data. In some examples, the first set of error control bits may include or be an example of an error control code (e.g., a data decode, an error code) and/or a link ECC. In some examples, a link error correcting code may be used to mitigate errors that occur due to communications over channels between memory device 110-a and host device 105-a (e.g., channels 115 as described with reference to FIG. 1).

Some examples of error control codes, when received by host device 105-a, may be used to detect and/or correct single-bit errors. For instance, the error control code may include or may be an example of a single error correcting (SEC) code or a single error correcting dual error detecting (SECDED) code, in which a single bit error of the data may be corrected. Other examples of error control codes, when received by host device 105-a, may be used to detect and/or correct multi-bit errors. For instance, the error control code may include or may be an example of a SECDED code, in which multiple bit errors of the data may be detected, or may be an example of a dual error correcting dual error detecting (DECDED) code, in which multiple bit errors of the data may be detected and/or corrected.

At 225, memory device 110-a may transform error control bits for the data into an error log indicator. For instance, memory device 110-a may transform the first set of error control bits into a second set of error control bits based on the error log including information. In some examples, performing the transformation may include memory device 110-a replacing a valid ECC conveyed by the error control bits (e.g., a SEC code corresponding to a single bit error or a SECDED or DECDED code corresponding to a single bit error or two bit errors) with an invalid ECC conveyed by the second set of error control bits (e.g., a SEC code corresponding to multiple bit errors, or a SECDED or DECDED code corresponding to more than two bit errors). Additionally or Alternatively, if the error control code associated with the data indicates a detectable or correctable error, the memory device 110-a may refrain from transforming the error control bits into the indicator about the error log. In such examples, the memory device 110-a may transmit the first set of error control bits associated with the data. The memory device 110-a may then attempt to transmit the indicator about the error log in a later transmission.

In some examples, memory device 110-a may perform the transformation if memory device 110-a determines that the error log includes information for use by host device 105-a. Additionally or alternatively, memory device 110-a may perform the transformation if memory device 110-a determines that the first set of error control bits includes an invalid error correction code (e.g., an error control code that is associated with zero errors or a multi-bit error that is not correctable or detectable reliably by the error control operation. Additionally or alternatively, memory device 110-a may perform the transformation if memory device 110-a determines that the first set of error control bits indicates that the data includes a multi-bit error that is uncorrectable or undetectable reliably by the error control operation.

At 230, memory device 110-a may transmit the error log indicator to host device 105-a. In some examples, the error log indicator may include link error correction code information associated with data transmitted to host device 105-a from memory device 110-a. In some examples, the error log indicator may comprise bits including a same value (e.g., all 1's or all 0's).

At 235, memory device 110-a may transmit the data to host device 105-a. In some examples, memory device 110-a may transmit the data substantially simultaneously with transmitting the error log indicator.

At 240, host device 105-a may determine that the error log of memory device 110-a includes information based on the error log indicator. For instance, the error log indicator may indicate, to host device 105-a, that the error log includes information.

At 245, host device 105-a may transmit, to memory device 110-a, a request for the information of the error log. In some examples, host device 105-a may transmit the request in response to determining that the error log of memory device 110-a includes data. In some examples, the request may include or may be an example of an MRR command.

At 250, memory device 110-a may transmit, to host device 105-a, the information of the error log. In some examples, memory device 110-a may transmit the information of the error log to host device 105-a in response to receiving the request for the information of the error log.

In some examples, host device 105-a may refrain from using the bits of the error log indicator for error correction or detection based on the error log indicator indicating that the error log of memory device 110-a includes the information.

In some examples, host device 105-a may receive additional data from memory device 110-a. Additionally, host device 105-a may receive a set of error control bits for the additional data. However, the set of error control bits for the additional data may differ from the second set of error control bits associated with the data received at 235. For instance, the set of error control bits for the additional data may have a value that differs from a value of the second set of error control bits and/or may have at least one bit with a polarity different than a polarity of the second set of error control bits. Accordingly, host device 105-*a* may perform error detection, error correction, or both using the set of error control bits for the additional data, but may refrain from performing error detection, error correction, or both using second set of error control bits associated with the data received at 235.

Figure 3:
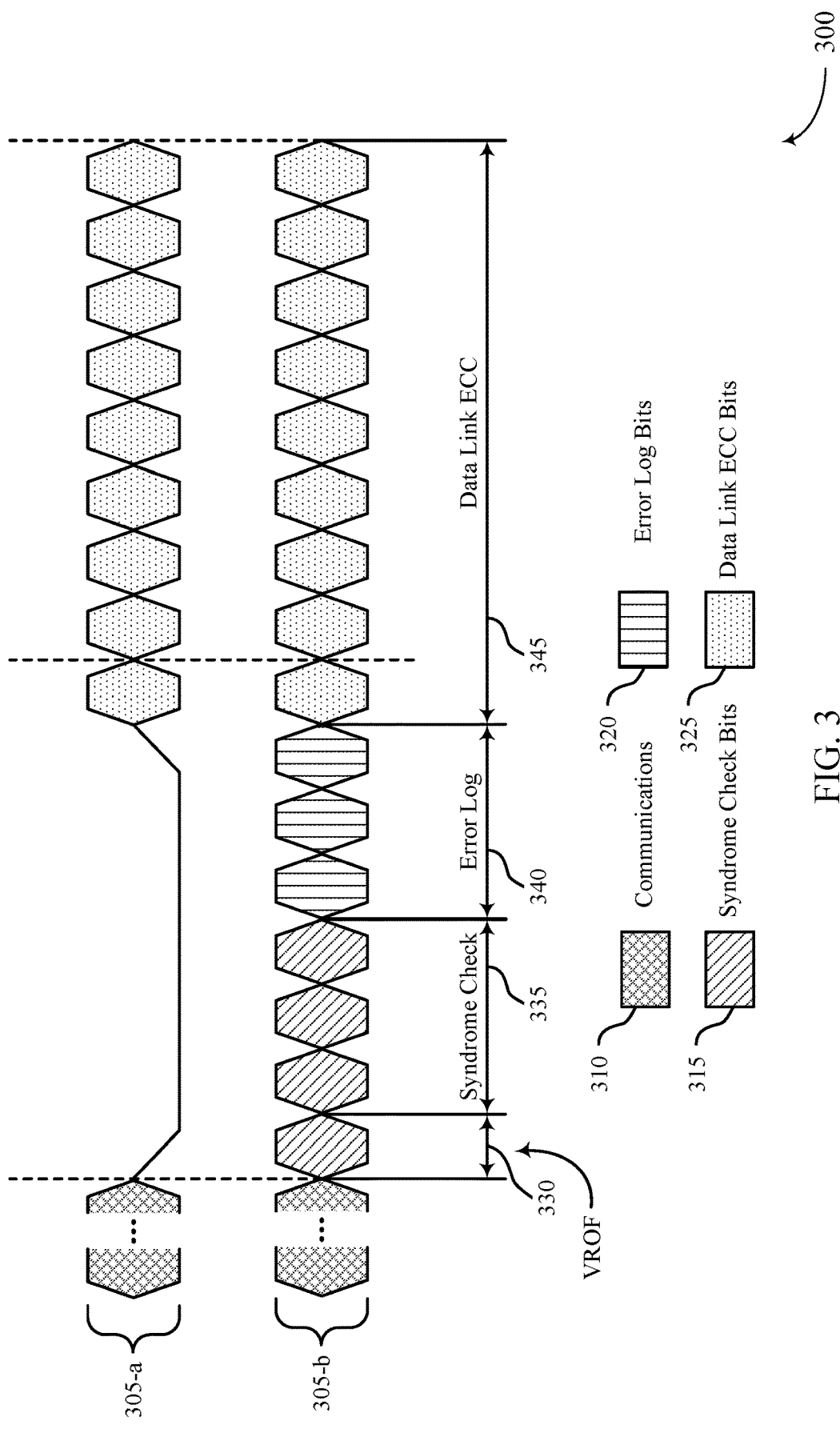
FIG. 3 illustrates an example of a timing diagram that supports error log indication via error control information in accordance with examples as disclosed herein.

FIG. 3 illustrates an example of a timing diagram 300 that supports error log indication via error control information in accordance with examples as disclosed herein. In some examples, timing diagram 300 may illustrate an example of communication protocols for conveying information associated with data retrieved from a memory array of a memory device (e.g., a memory device 110 as described with reference to FIG. 1).

Communication protocol 305-*a* may represent a protocol for communicating information over a DMI channel associated with the data when a DSF+ protocol is not enabled. Communication protocol 305-*b* may represent a protocol for communicating information over a DMI channel associated with the data when DSF+ protocol is disabled. Initially, for both communication protocol 305-*a* and 305-*b*, communications 310 (e.g., communications between a memory device and a host device) may occur. During interval 330 and according to communication protocol 305-*b*, the memory device may convey information indicating a VROF status. Similarly, during interval 335 and according to communication protocol 305-*b*, the memory device may convey a set of syndrome check bits 315. Additionally, during interval 340 and according to communication protocol 305-*b*, the memory device may convey error log bits 320, which may convey an error state of the error log (e.g., the information conveyed at 250 in FIG. 2). However, during intervals 330, 335, and 340 and according to communication protocol 305-*a*, the memory device may not convey information indicating the VROF status and may not transmit the syndrome check bits 315 and/or the error log bits 320. During interval 345 and according to either one of communication protocols 305-*a* and 305-*b*, the memory device may convey data link ECC bits 325 (e.g., error control bits as described herein). A unit interval (UI) may refer to a period of time used to communicate a symbol over a channel. In some cases, such as single data rate (SDR) systems, a UI may be one clock cycle. In some cases, such as a double data rate (DDR) systems, a UI may be a rising edge of clock cycle or a falling edge of a clock cycle. In some examples, interval 330 may span bit ui0, interval 335 may span bits ui1 through ui3, interval 340 may span bits ui4 through ui6, and interval 345 may span bits ui7 through ui16. In some examples, the error log may be or may include a master error log.

If a memory device uses communication protocol 305-*a*, the memory device may not have a dedicated interval (e.g., such as interval 340) for transmitting the error log bits 320. To mitigate the lack of a dedicated interval, a host device may periodically transmit an MRR command to the memory device to obtain a status of the error log. However, communicating the MRR command may put additional burden on the host device and may also not be implemented as real time fault checking. To lower the burden on the host and/or to enable real time fault checking, the memory device may provide the error log bits 320 during interval 245 (e.g., during the read data link ECC range). For instance, if no fault occurs that would be recorded at the error log, the memory device may not alter data link ECC bits 325. However, if such a fault does occur, the memory device may alter data link ECC bits 325.

The altered data link ECC bits 325 (e.g., for ui7 through ui14) may have check bits that do not align to valid data decodes (e.g., valid error control codes). For instance, if the data decode is an example of an SEC code corresponding to a single bit error or an example of a SECDED or DECDED code corresponding to a single bit error or two bit errors, then the data decode may be valid. Additionally or alternatively, if the data decode corresponds to an aliasing address, the data decode may be valid. Examples of bit values corresponding to aliasing addresses may include bit values 24 through 31, 40 through 63, 72 through 103, 152 through 183, 192 through 215, 224 through 231, or any combination thereof. Additionally or alternatively, the altered data link ECC bits 325 (e.g., for ui7 through ui14) may have check bits that do align to non-valid data error codes. For instance, if the data decode is an example of an SEC code corresponding to multiple bit errors or is an example of a SECDED or DECDED code corresponding to more than two bits errors, the data decode may be non-valid or invalid. Additionally or alternatively, if the data decode corresponds to a non-aliasing address, the data decode may be non-valid or invalid. Examples of non-aliasing addresses may include bit values 1 through 23, 32 through 39, 64 through 71, 104 through 151, 184 through 191, 216 through 223, 232 through 255, or any combination thereof.

In some examples, the memory device may use a non-valid data decode to indicate that an error log of the memory device includes information for the host device. In some examples, the non-valid data decode used may be 255 (e.g., UE7 through ui14 may be all set to 1). Additionally or alternatively, the non-valid data decode used may be 219 (e.g., 11011011). Additionally or alternatively, the non-valid data decode used may be 223 (e.g., 11111011). Using a data decode of 223 may mitigate a conflict associated with providing VROF via MRR and/or may enable the non-valid data decode of 219 to be used to signal a syndrome check fault.

After the host device reads the data decode (e.g., error code) of 223, the host device may determine that the memory device has sent multi-bit error data or has an error log fault. In some such examples, the host device may transmit, to the memory device, an MRR to a register of the memory device that stores the error log fault status. In some examples, ui15 (e.g., the last bit of data link ECC bits 325) may be a dual error detection (DED) bit for data sent from the memory device to the host device. In some examples, the DED bit can be set to an opposite polarity during a fault condition (e.g., an error log fault condition). Accordingly, the host device may detect between a multi-bit error (e.g., in which the DED bit may have a first polarity or value) and an error log fault (e.g., in which the DED bit may have a second polarity or value) Additionally or alternatively, the memory device may transmit the data as all 1's or all 0's. For instance, if the data is all 1's or all 0's and/or the data link ECC bits 325 indicate an error log fault condition, the host device may determine that an error log fault is present at the memory device. However, if that data is not all 1's or all 0's, the host device may determine that no error log fault is present at the memory device.

In some examples, the techniques described herein may have one or more advantages. For instance, indicating that an error log fault is present via data link ECC bits 325 and/or data (e.g., by setting the data to all 1's and/or all 0's) may enable the host device to determine that the memory device has an error log fault in examples in which the system including the host device and the memory device does not implement a DSF+ protocol. Additionally, using the polarity of the DED bit and/or setting the data to all 1's and/or all 0's may enable the host device to differentiate between whether a value of data link ECC bits 325 corresponds to a multi-bit error or to an indication that an error log fault is present at the memory device.

Figure 4:
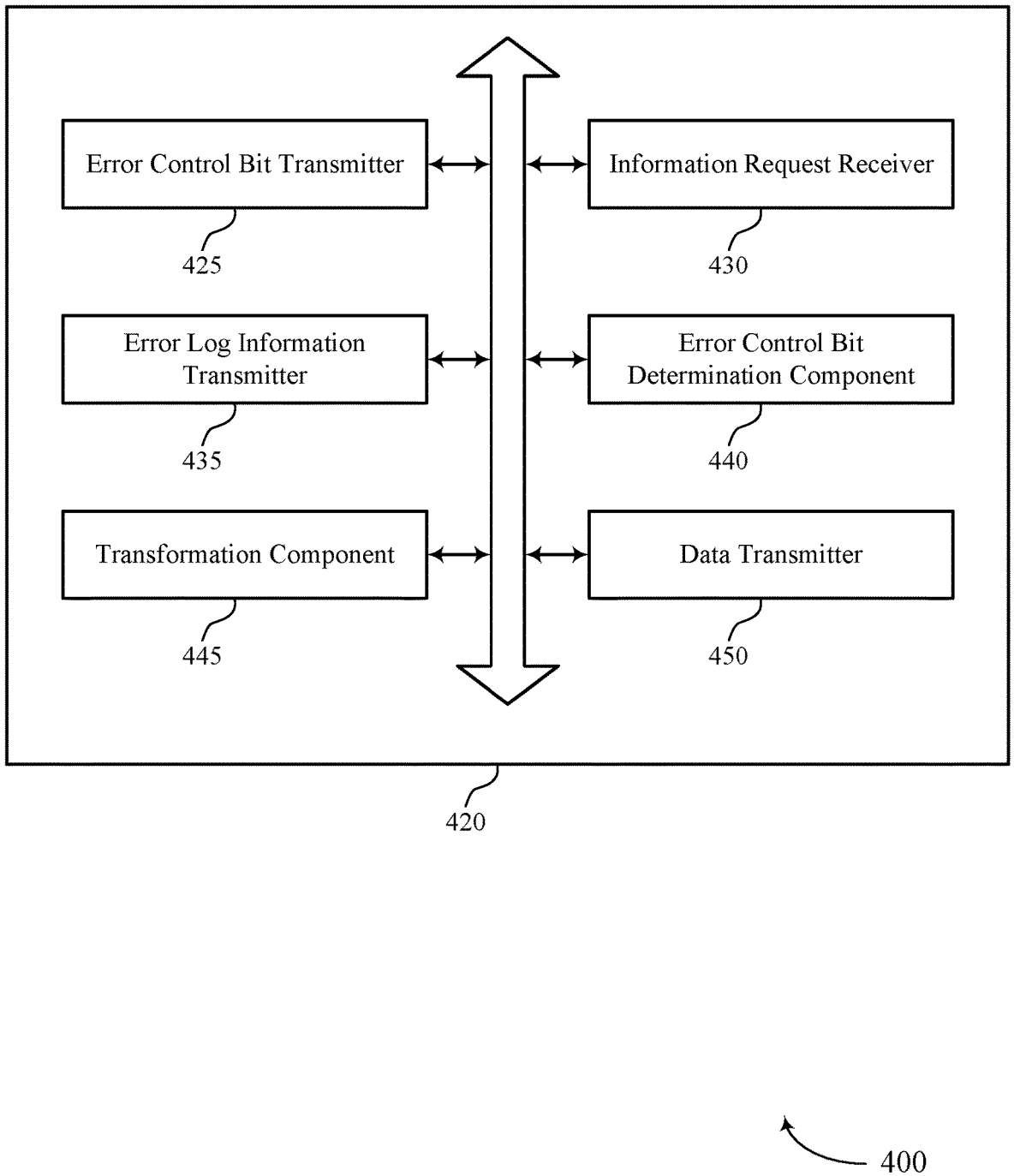
FIG. 4 shows a block diagram of a memory device that supports error log indication via error control information in accordance with examples as disclosed herein.

FIG. 4 shows a block diagram 400 of a memory device 420 that supports error log indication via error control information in accordance with examples as disclosed herein. The memory device 420 may be an example of aspects of a memory device as described with reference to FIGS. 1 through 3. The memory device 420, or various components thereof, may be an example of means for performing various aspects of error log indication via error control information as described herein. For example, the memory device 420 may include an error control bit transmitter 425, an information request receiver 430, an error log information transmitter 435, an error control bit determination component 440, a transformation component 445, a data transmitter 450, or any combination thereof. Each of these components may communicate, directly or indirectly, with one another (e.g., via one or more buses).

The error control bit transmitter 425 may be configured as or otherwise support a means for transmitting, to a host device, a first signal including a set of error control bits indicating that an error log of the memory device includes information for use by the host device. The information request receiver 430 may be configured as or otherwise support a means for receiving, from the host device in response to the first signal, a second signal including a request to retrieve the information of the error log. The error log information transmitter 435 may be configured as or otherwise support a means for transmitting, to the host device in response to the second signal, a third signal including the information of the error log.

In some examples, the error control bit determination component 440 may be configured as or otherwise support a means for determining a second set of error control bits based at least in part on data retrieved from the memory device. In some examples, the transformation component 445 may be configured as or otherwise support a means for transforming the second set of error control bits into the set of error control bits based at least in part on the error log including the information, where transmitting the first signal that includes the set of error control bits is based at least in part on transforming the second set of error control bits into the set of error control bits.

In some examples, the transformation component 445 may be configured as or otherwise support a means for determining that the error log includes the information for use by the host device, where transforming the second set of error control bits into the set of error control bits is based at least in part on the identifying.

In some examples, the transformation component 445 may be configured as or otherwise support a means for determining that the second set of error control bits includes an invalid error control code, where transforming the second set of error control bits into the set of error control bits is based at least in part on the determining.

In some examples, the transformation component 445 may be configured as or otherwise support a means for determining that the second set of error control bits indicates that the data includes a multi-bit error that is uncorrectable, where transforming the second set of error control bits into the set of error control bits is based at least in part on the determining.

In some examples, the data transmitter 450 may be configured as or otherwise support a means for transmitting, to the host device, a fourth signal including data retrieved from the memory device, the data associated with the set of error control bits, where transmitting the fourth signal is part of the transmitting the set of error control bits.

In some examples, the set of error control bits includes read link error correction code information associated with data transmitted to the host device from the memory device.

In some examples, the request includes a mode register read command.

Figure 5:
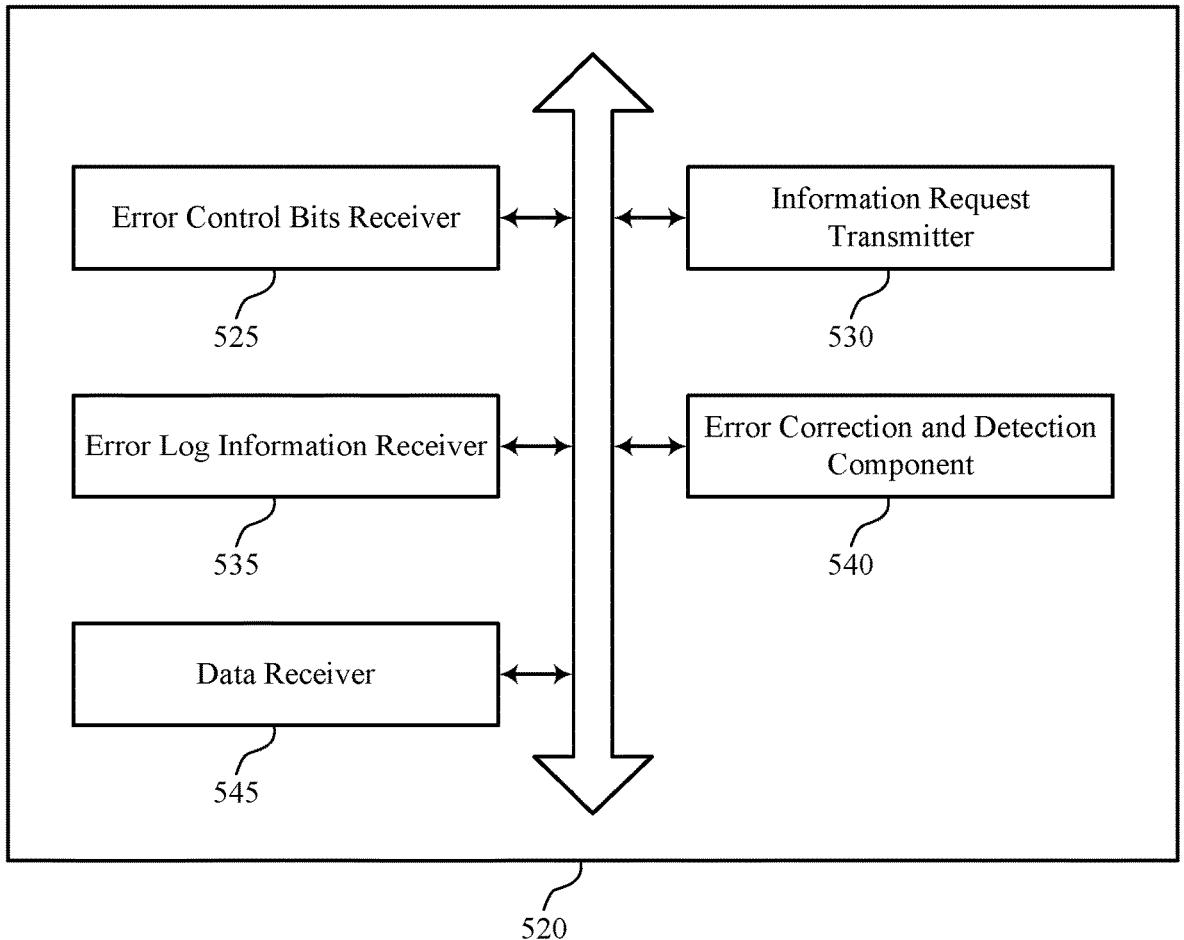
FIG. 5 shows a block diagram of a host device that supports error log indication via error control information in accordance with examples as disclosed herein.

FIG. 5 shows a block diagram 500 of a host device 520 that supports error log indication via error control information in accordance with examples as disclosed herein. The host device 520 may be an example of aspects of a host device as described with reference to FIGS. 1 through 3. The host device 520, or various components thereof, may be an example of means for performing various aspects of error log indication via error control information as described herein. For example, the host device 520 may include an error control bits receiver 525, an information request transmitter 530, an error log information receiver 535, an error correction and detection component 540, a data receiver 545, or any combination thereof. Each of these components may communicate, directly or indirectly, with one another (e.g., via one or more buses).

The error control bits receiver 525 may be configured as or otherwise support a means for receiving, from a memory device, a first signal including a set of error control bits indicating that an error log of the memory device includes information for use by the host device. The information request transmitter 530 may be configured as or otherwise support a means for transmitting, to the memory device in response to the first signal, a second signal including a request to retrieve the information of the error log. The error log information receiver 535 may be configured as or otherwise support a means for receiving, from the memory device in response to the second signal, a third signal including the information of the error log.

In some examples, the error correction and detection component 540 may be configured as or otherwise support a means for refraining from using the set of error control bits for error correction or detection based at least in part on the set of error control bits indicating that the error log of the memory device includes the information.

In some examples, the error control bits receiver 525 may be configured as or otherwise support a means for receiving a fourth signal including a second set of error control bits. In some examples, the error correction and detection component 540 may be configured as or otherwise support a means for performing error detection, error correction, or both based at least in part on a value of the second set of error control bits differing from a value of the set of error control bits.

In some examples, the error control bits receiver 525 may be configured as or otherwise support a means for receiving a fourth signal including a second set of error control bits. In some examples, the error correction and detection component 540 may be configured as or otherwise support a means for performing error detection, error correction, or both based at least in part on a polarity of at least one bit of the second set of error control bits differing from a polarity of at least one bit of the set of error control bits.

In some examples, the data receiver 545 may be configured as or otherwise support a means for receiving, from the memory device, a fourth signal including data associated with the set of error control bits indicating that the error log of the memory device includes the information for use by the host device.

In some examples, the data includes a second set of error control bits. In some examples, the second set of error control bits indicates that the error log of the memory device includes the information for use by the host device based at least in part on each bit of the second set of error control bits including a same value as each other bit of the second set of error control bits.

Figure 6:
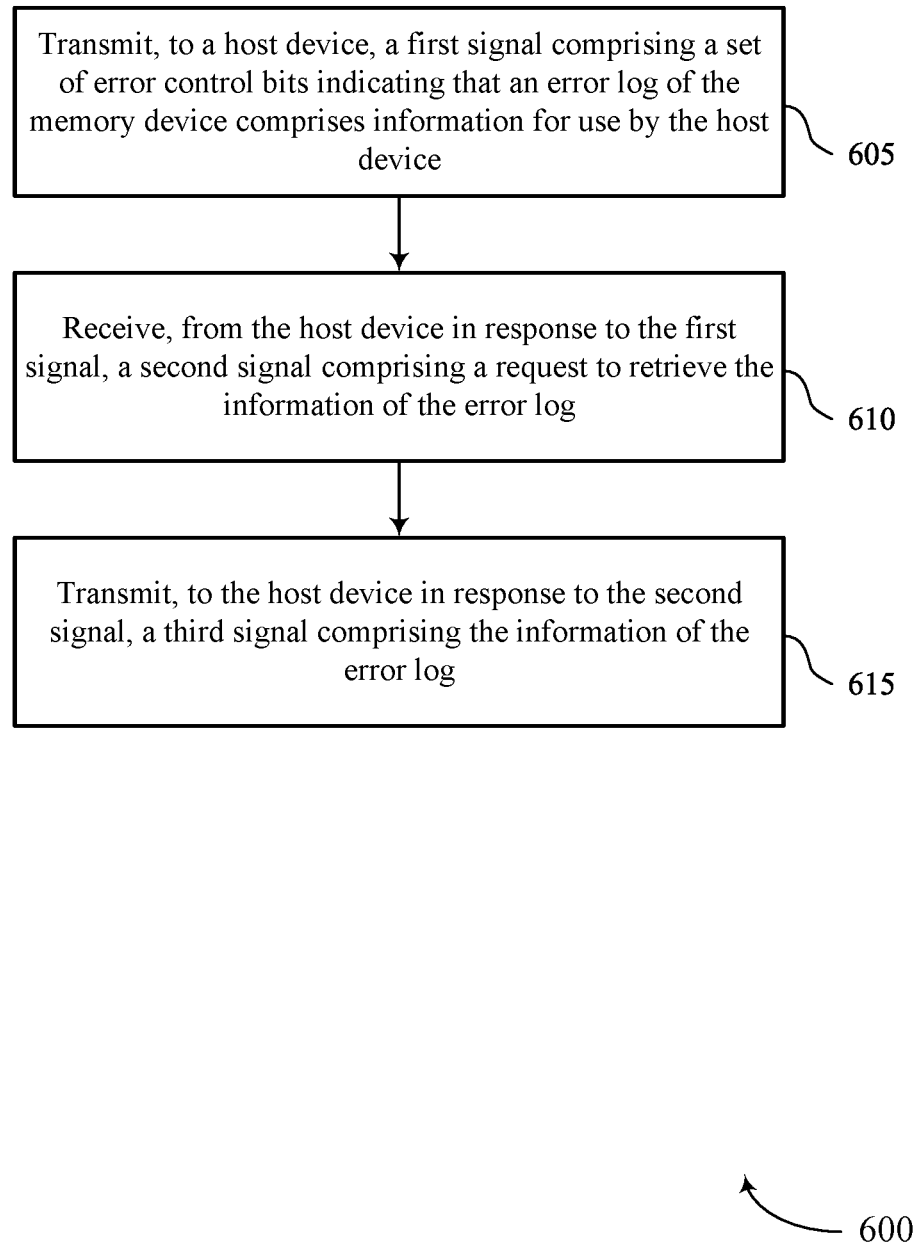
FIGS. 6 and 7 show flowcharts illustrating a method or methods that support error log indication via error control information in accordance with examples as disclosed herein.

FIG. 6 shows a flowchart illustrating a method 600 that supports error log indication via error control information in accordance with examples as disclosed herein. The operations of method 600 may be implemented by a memory device or its components as described herein. For example, the operations of method 600 may be performed by a memory device as described with reference to FIGS. 1 through 4. In some examples, a memory device may execute a set of instructions to control the functional elements of the device to perform the described functions. Additionally or alternatively, the memory device may perform aspects of the described functions using special-purpose hardware.

At 605, the method may include transmitting, to a host device, a first signal including a set of error control bits indicating that an error log of the memory device includes information for use by the host device. The operations of 605 may be performed in accordance with examples as disclosed herein. In some examples, aspects of the operations of 605 may be performed by an error control bit transmitter 425 as described with reference to FIG. 4.

At 610, the method may include receiving, from the host device in response to the first signal, a second signal including a request to retrieve the information of the error log. The operations of 610 may be performed in accordance with examples as disclosed herein. In some examples, aspects of the operations of 610 may be performed by an information request receiver 430 as described with reference to FIG. 4.

At 615, the method may include transmitting, to the host device in response to the second signal, a third signal including the information of the error log. The operations of 615 may be performed in accordance with examples as disclosed herein. In some examples, aspects of the operations of 615 may be performed by an error log information transmitter 435 as described with reference to FIG. 4.

In some examples, an apparatus as described herein may perform a method or methods, such as the method 600. The apparatus may include, features, circuitry, logic, means, or instructions (e.g., a non-transitory computer-readable medium storing instructions executable by a processor) for transmitting, to a host device, a first signal including a set of error control bits indicating that an error log of the memory device includes information for use by the host device, receiving, from the host device in response to the first signal, a second signal including a request to retrieve the information of the error log, and transmitting, to the host device in response to the second signal, a third signal including the information of the error log.

Some examples of the method 600 and the apparatus described herein may further include operations, features, circuitry, logic, means, or instructions for determining a second set of error control bits based at least in part on data retrieved from the memory device and transforming the second set of error control bits into the set of error control bits based at least in part on the error log including the information, where transmitting the first signal that includes the set of error control bits may be based at least in part on transforming the second set of error control bits into the set of error control bits.

Some examples of the method 600 and the apparatus described herein may further include operations, features, circuitry, logic, means, or instructions for determining that the error log includes the information for use by the host device, where transforming the second set of error control bits into the set of error control bits may be based at least in part on the identifying.

Some examples of the method 600 and the apparatus described herein may further include operations, features, circuitry, logic, means, or instructions for determining that the second set of error control bits includes an invalid error control code, where transforming the second set of error control bits into the set of error control bits may be based at least in part on the determining.

Some examples of the method 600 and the apparatus described herein may further include operations, features, circuitry, logic, means, or instructions for determining that the second set of error control bits indicates that the data includes a multi-bit error that may be uncorrectable, where transforming the second set of error control bits into the set of error control bits may be based at least in part on the determining.

Some examples of the method 600 and the apparatus described herein may further include operations, features, circuitry, logic, means, or instructions for transmitting, to the host device, a fourth signal including data retrieved from the memory device, the data associated with the set of error control bits, where transmitting the fourth signal may be part of the transmitting the set of error control bits.

In some examples of the method 600 and the apparatus described herein, the set of error control bits includes read link error correction code information associated with data transmitted to the host device from the memory device.

In some examples of the method 600 and the apparatus described herein, the request includes a mode register read command.

Figure 7:
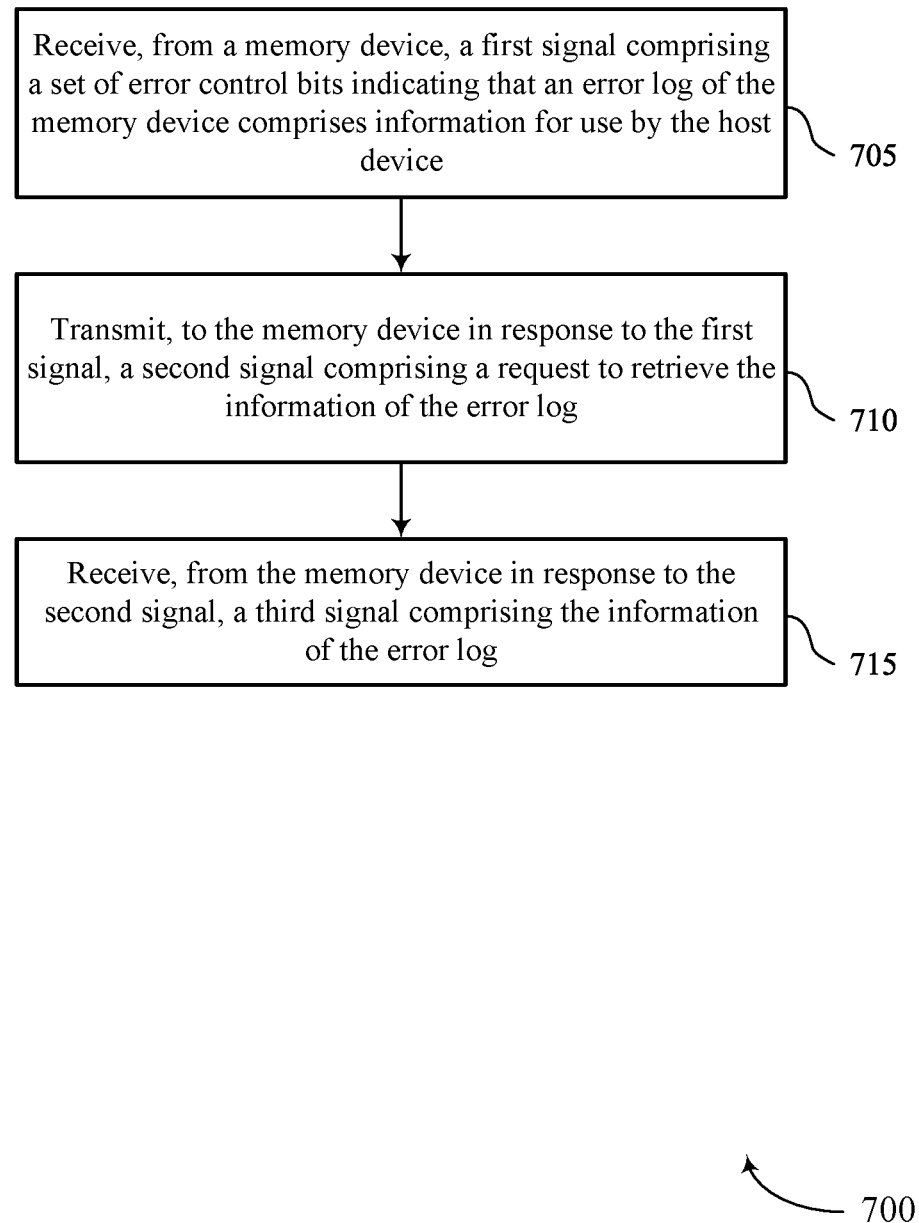

FIG. 7 shows a flowchart illustrating a method 700 that supports error log indication via error control information in accordance with examples as disclosed herein. The operations of method 700 may be implemented by a host device or its components as described herein. For example, the operations of method 700 may be performed by a host device as described with reference to FIGS. 1 through 3 and 5. In some examples, a host device may execute a set of instructions to control the functional elements of the device to perform the described functions. Additionally or alternatively, the host device may perform aspects of the described functions using special-purpose hardware.

At 705, the method may include receiving, from a memory device, a first signal including a set of error control bits indicating that an error log of the memory device includes information for use by the host device. The operations of 705 may be performed in accordance with examples as disclosed herein. In some examples, aspects of the operations of 705 may be performed by an error control bits receiver 525 as described with reference to FIG. 5.

At 710, the method may include transmitting, to the memory device in response to the first signal, a second signal including a request to retrieve the information of the error log. The operations of 710 may be performed in accordance with examples as disclosed herein. In some examples, aspects of the operations of 710 may be performed by an information request transmitter 530 as described with reference to FIG. 5.

At 715, the method may include receiving, from the memory device in response to the second signal, a third signal including the information of the error log. The operations of 715 may be performed in accordance with examples as disclosed herein. In some examples, aspects of the operations of 715 may be performed by an error log information receiver 535 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving, from a memory device, a first signal including a set of error control bits indicating that an error log of the memory device includes information for use by the host device, transmitting, to the memory device in response to the first signal, a second signal including a request to retrieve the information of the error log, and receiving, from the memory device in response to the second signal, a third signal including the information of the error log.

Some examples of the method 700 and the apparatus described herein may further include operations, features, circuitry, logic, means, or instructions for refraining from using the set of error control bits for error correction or detection based at least in part on the set of error control bits indicating that the error log of the memory device includes the information.

Some examples of the method 700 and the apparatus described herein may further include operations, features, circuitry, logic, means, or instructions for receiving a fourth signal including a second set of error control bits and performing error detection, error correction, or both based at least in part on a value of the second set of error control bits differing from a value of the set of error control bits.

Some examples of the method 700 and the apparatus described herein may further include operations, features, circuitry, logic, means, or instructions for receiving a fourth signal including a second set of error control bits and performing error detection, error correction, or both based at least in part on a polarity of at least one bit of the second set of error control bits differing from a polarity of at least one bit of the set of error control bits.

Some examples of the method 700 and the apparatus described herein may further include operations, features, circuitry, logic, means, or instructions for receiving, from the memory device, a fourth signal including data associated with the set of error control bits indicating that the error log of the memory device includes the information for use by the host device.

In some examples of the method 700 and the apparatus described herein, the data includes a second set of error control bits, and the second set of error control bits indicates that the error log of the memory device includes the information for use by the host device based at least in part on each bit of the second set of error control bits including a same value as each other bit of the second set of error control bits.

It should be noted that the methods described herein describe possible implementations, and that the operations and the steps may be rearranged or otherwise modified and that other implementations are possible. Further, portions from two or more of the methods may be combined.

Another apparatus is described. The apparatus may include a memory array including an array of memory cells that each include capacitive storage elements, a circuit coupled with the memory array and configured to cause the apparatus to, transmit, to a host device, a first signal including a set of error control bits indicating that an error log of the apparatus includes information for use by the host device, receive, from the host device in response to the first signal, a second signal including a request to retrieve the information of the error log, and transmit, to the host device in response to the second signal, a third signal including the information of the error log.

In some examples, the apparatus may include determine a second set of error control bits based at least in part on data retrieved from the apparatus and transforming the second set of error control bits into the set of error control bits based at least in part on the error log including the information, where transmitting the first signal that includes the set of error control bits may be based at least in part on transforming the second set of error control bits into the set of error control bits.

In some examples, the apparatus may include determine that the error log includes the information for use by the host device, where transforming the second set of error control bits into the set of error control bits may be based at least in part on the identifying.

In some examples, the apparatus may include determine that the second set of error control bits includes an invalid error control code, where transforming the second set of error control bits into the set of error control bits may be based at least in part on the determining.

In some examples, the apparatus may include determine that the second set of error control bits indicates that the data includes a multi-bit error that may be uncorrectable, where transforming the second set of error control bits into the set of error control bits may be based at least in part on the determining.

In some examples, the apparatus may include transmit, to the host device, a fourth signal including data retrieved from the apparatus, the data associated with the set of error control bits.

In some examples of the apparatus, the set of error control bits includes read link error correction code information associated with data transmitted to the host device from the apparatus.

In some examples of the apparatus, the request includes a mode register read command.

Another apparatus is described. The apparatus may include a circuit configured to cause the apparatus to, receive, from a memory device, a first signal including a set of error control bits indicating that an error log of the memory device includes information for use by the apparatus, transmit, to the memory device in response to the first signal, a second signal including a request to retrieve the information of the error log, and receive, from the memory device in response to the second signal, a third signal including the information of the error log.

In some examples, the apparatus may include refrain from using the set of error control bits for error correction or detection based at least in part on the set of error control bits indicating that the error log of the memory device includes the information.

In some examples, the apparatus may include receive a fourth signal including a second set of error control bits and perform error detection, error correction, or both based at least in part on a value of the second set of error control bits differing from a value of the set of error control bits.

In some examples, the apparatus may include receive a fourth signal including a second set of error control bits and perform error detection, error correction, or both based at least in part on a polarity of at least one bit of the second set of error control bits differing from a polarity of at least one bit of the set of error control bits.

In some examples, the apparatus may include receive, from the memory device, a fourth signal including data associated with the set of error control bits indicating that the error log of the memory device includes the information for use by the apparatus.

In some examples of the apparatus, the data includes a second set of error control bits, and the second set of error control bits indicates that the error log of the memory device includes the information for use by the apparatus based at least in part on each bit of the second set of error control bits including a same value as each other bit of the second set of error control bits.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) may not be absolute but is close enough to achieve the advantages of the characteristic.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
transmitting, to a host device, a first signal comprising a set of error control bits indicating that an error log of a memory device comprises information for use by the host device;
receiving, from the host device in response to the first signal, a second signal comprising a request to retrieve the information of the error log; and
transmitting, to the host device in response to the second signal, a third signal comprising the information of the error log.

2. The method of claim 1, further comprising:
determining a second set of error control bits based at least in part on data retrieved from the memory device; and
transforming the second set of error control bits into the set of error control bits based at least in part on the error log comprising the information, wherein transmitting the first signal that comprises the set of error control bits is based at least in part on transforming the second set of error control bits into the set of error control bits.

3. The method of claim 2, further comprising:
determining that the error log includes the information for use by the host device, wherein transforming the second set of error control bits into the set of error control bits is based at least in part on the determining.

4. The method of claim 2, further comprising:
determining that the second set of error control bits comprises an invalid error control code, wherein transforming the second set of error control bits into the set of error control bits is based at least in part on the determining.

5. The method of claim 2, further comprising:
determining that the second set of error control bits indicates that the data includes a multi-bit error that is uncorrectable, wherein transforming the second set of error control bits into the set of error control bits is based at least in part on the determining.

6. The method of claim 1, further comprising:
transmitting, to the host device, a fourth signal comprising data retrieved from the memory device, the data associated with the set of error control bits, wherein transmitting the fourth signal is part of the transmitting the set of error control bits.

7. The method of claim 1, wherein the set of error control bits comprises read link error correction code information associated with data transmitted to the host device from the memory device.

8. The method of claim 1, wherein the request comprises a mode register read command.

9. A method at a host device, comprising:
receiving, from a memory device, a first signal comprising a set of error control bits indicating that an error log of the memory device comprises information for use by the host device;

transmitting, to the memory device in response to the first signal, a second signal comprising a request to retrieve the information of the error log; and receiving, from the memory device in response to the second signal, a third signal comprising the information of the error log.

10. The method of claim 9, further comprising:
refraining from using the set of error control bits for error correction or detection based at least in part on the set of error control bits indicating that the error log of the memory device comprises the information.

11. The method of claim 9, further comprising:
receiving a fourth signal comprising a second set of error control bits; and
performing error detection, error correction, or both based at least in part on a value of the second set of error control bits differing from a value of the set of error control bits.

12. The method of claim 9, further comprising:
receiving a fourth signal comprising a second set of error control bits; and
performing error detection, error correction, or both based at least in part on a polarity of at least one bit of the second set of error control bits differing from a polarity of at least one bit of the set of error control bits.

13. The method of claim 9, further comprising:
receiving, from the memory device, a fourth signal comprising data associated with the set of error control bits indicating that the error log of the memory device comprises the information for use by the host device.

14. The method of claim 13, wherein
the data comprises a second set of error control bits, and
the second set of error control bits indicates that the error log of the memory device comprises the information for use by the host device based at least in part on each bit of the second set of error control bits comprising a same value as each other bit of the second set of error control bits.

15. An apparatus, comprising:
a memory array comprising an array of memory cells that each comprise capacitive storage elements;
a circuit coupled with the memory array and configured to cause the apparatus to:
transmit, to a host device, a first signal comprising a set of error control bits indicating that an error log of the apparatus comprises information for use by the host device;
receive, from the host device in response to the first signal, a second signal comprising a request to retrieve the information of the error log; and
transmit, to the host device in response to the second signal, a third signal comprising the information of the error log.

16. The apparatus of claim 15, wherein the circuit is configured to cause the apparatus to:
determine a second set of error control bits based at least in part on data retrieved from the apparatus; and
transforming the second set of error control bits into the set of error control bits based at least in part on the error log comprising the information, wherein transmitting the first signal that comprises the set of error control bits is based at least in part on transforming the second set of error control bits into the set of error control bits.

17. The apparatus of claim 16, wherein the circuit is configured to cause the apparatus to:
determine that the error log includes the information for use by the host device, wherein transforming the second set of error control bits into the set of error control bits is based at least in part on the determining.

18. The apparatus of claim 16, wherein the circuit is configured to cause the apparatus to:
determine that the second set of error control bits comprises an invalid error control code, wherein transforming the second set of error control bits into the set of error control bits is based at least in part on the determining.

19. The apparatus of claim 16, wherein the circuit is configured to cause the apparatus to:
determine that the second set of error control bits indicates that the data includes a multi-bit error that is uncorrectable, wherein transforming the second set of error control bits into the set of error control bits is based at least in part on the determining.

20. The apparatus of claim 15, wherein the circuit is configured to cause the apparatus to:
transmit, to the host device, a fourth signal comprising data retrieved from the apparatus, the data associated with the set of error control bits.

21. The apparatus of claim 15, wherein the set of error control bits comprises read link error correction code information associated with data transmitted to the host device from the apparatus.

22. The apparatus of claim 15, wherein the request comprises a mode register read command.

23. An apparatus, comprising:
a circuit configured to cause the apparatus to:
receive, from a memory device, a first signal comprising a set of error control bits indicating that an error log of the memory device comprises information for use by the apparatus;
transmit, to the memory device in response to the first signal, a second signal comprising a request to retrieve the information of the error log; and
receive, from the memory device in response to the second signal, a third signal comprising the information of the error log.

24. The apparatus of claim 23, wherein the circuit is configured to cause the apparatus to:
refrain from using the set of error control bits for error correction or detection based at least in part on the set of error control bits indicating that the error log of the memory device comprises the information.

25. The apparatus of claim 23, wherein the circuit is configured to cause the apparatus to:
receive a fourth signal comprising a second set of error control bits; and
perform error detection, error correction, or both based at least in part on a value of the second set of error control bits differing from a value of the set of error control bits.

26. The apparatus of claim 23, wherein the circuit is configured to cause the apparatus to:
receive a fourth signal comprising a second set of error control bits; and
perform error detection, error correction, or both based at least in part on a polarity of at least one bit of the second set of error control bits differing from a polarity of at least one bit of the set of error control bits.

27. The apparatus of claim 23, wherein the circuit is configured to cause the apparatus to:
receive, from the memory device, a fourth signal comprising data associated with the set of error control bits indicating that the error log of the memory device comprises the information for use by the apparatus.

28. The apparatus of claim 27, wherein the data comprises a second set of error control bits, and the second set of error control bits indicates that the error log of the memory device comprises the information for use by the apparatus based at least in part on each bit of the second set of error control bits comprising a same value as each other bit of the second set of error control bits.

\* \* \* \* \*